UNITED STATES PATENT OFFICE 1,978,444

PRESERVATION OF RUBBER

Ira Williams, Woodstown, and William A. Douglass, Pennsgrove, N. J., and Arthur Morrill Neal, Wilmington, Del., assignors to E. I. du Pont de Nemours & Company, Wilmington, Del., a corporation of Delaware No Drawing. Application October 11, 1933, Serial No. 693,146

12 Claims. (Cl. 18—50)

This invention relates to the preservation of rubber and more particularly to the incorporation therein of compounds which retard that deterioration which is normally due to the action of heat and oxidation.

It is well known that many materials possess the property, when incorporated in rubber, of retarding that deterioration which rubber normally undergoes when exposed to the action of heat and oxidation. Among the earliest types of compounds employed for this purpose were the naphthalene diamines such as 1-8-naphthalene diamine, as disclosed in U. S. Patent 1,532,398. The importance of this class of compounds is lessened, however, by the fact that they are relatively toxic and also because of their activating effect on many of the common accelerators used in practice.

This application is a continuation in part of our copending application, Serial No. 639,478, filed on or about October 25, 1932.

An object of the present invention is to provide vulcanized rubber having improved age-resisting properties. A further object is to incorporate in rubber a new class of compounds having exceptional preserving properties which are non-toxic and in general have no effect on the rate of cure when incorporated into rubber prior to vulcanization. Other objects are to provide new compositions of matter and to advance the art. Still other objects will appear hereinafter.

These objects may be accomplished in accordance with our invention which comprises incorporating into rubber, before or after vulcanization thereof, compounds of the type:

$$R-\overset{H}{N}-A-\overset{H}{N}-R'$$

in which A represents a naphthalene nucleus and R and R' represent the same or different members of the group comprising alkyl, aralkyl and aryl groups. The aryl nucleus may contain one or more hydroxy, alkyl or alkoxy groups. The term "aralkyl" as employed herein is to be understood to mean an alkyl group having at least one hydrogen substituted by an aryl nucleus.

Among the compounds of this class which we have found to be particularly satisfactory for our purpose are the following:

2:7-diphenyl naphthalene diamine

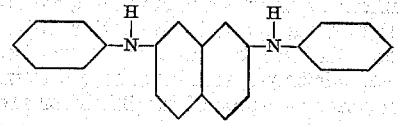

2:7-di-p-phenetyl naphthalene diamine

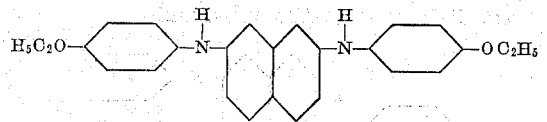

1:5-diphenyl naphthalene diamine

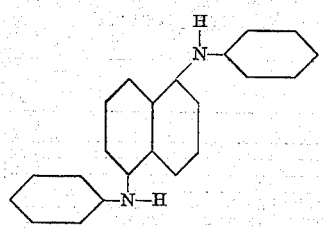

1:8-diphenyl naphthalene diamine

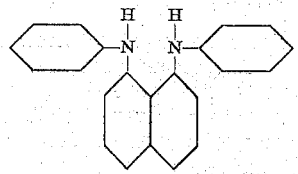

1-phenyl-4-p-phenetyl naphthalene diamine

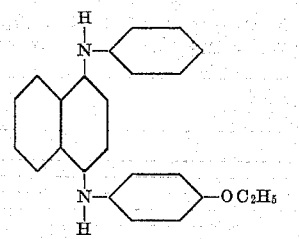

1-phenyl-4-p(OH)-phenyl naphthalene diamine

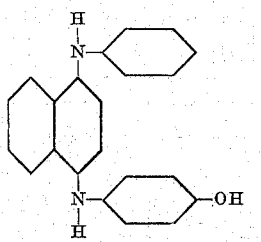

1:5-di-p(OH)-phenyl naphthalene diamine

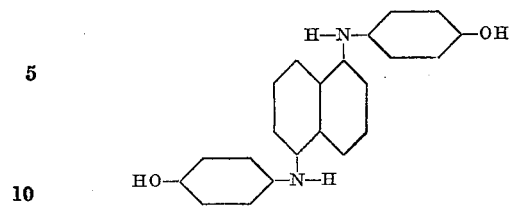

1:5-dibutyl naphthalene diamine

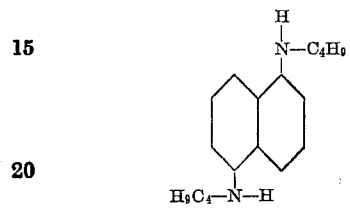

2:6-diphenyl-naphthalene-diamine

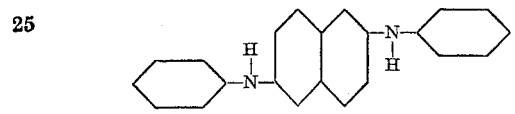

In order to test this class of compounds the two following stocks were prepared:

|  | A | B |
|---|---|---|
| Pale crepe | 100.0 | 100.0 |
| Zinc oxide | 3.0 | 3.0 |
| Titanox* | 50.0 | 50.0 |
| Sulfur | 2.0 | 2.0 |
| Tetra methyl thiuram mono sulfide | 0.2 | 0.2 |
| 1:5-di-p(OH) phenyl amido naphthalene | | 1.0 |

* Titanox is the trade name of a mixture of 75% barium sulfate and 25% titanium dioxide. (Gardner Chemical Synonyms and Trade Names 3d Ed. 1930 p. 328)

These stocks were cured to comparable states of cure at 20 lbs. steam pressure. Their relative aging properties were determined by suspending samples in a Bierer Davis bomb at 70° C. and 300 lbs. oxygen pressure. After 7 days under these conditions stock A was completely deteriorated, whereas stock B, containing the deterioration inhibitor, was still in good condition after 17 days, when the test was discontinued.

In order to test this class of compounds still further, the following stocks were prepared:

|  | A | B | C | D | E | F | G | H | I |
|---|---|---|---|---|---|---|---|---|---|
| Pale crepe | 100 | 100 | 100 | 100 | 100 | 100 | 100 | 100 | 100 |
| Zinc oxide | 100 | 100 | 100 | 100 | 100 | 100 | 100 | 100 | 100 |
| Lithopone | 20 | 20 | 20 | 20 | 20 | 20 | 20 | 20 | 20 |
| Stearic acid | 1 | 1 | 1 | 1 | 1 | 1 | 1 | 1 | 1 |
| Sulfur | 3 | 3 | 3 | 3 | 3 | 3 | 3 | 3 | 3 |
| Diortho tolyl guanidine | .75 | .75 | .75 | .57 | .75 | .75 | .75 | .75 | .75 |
| 2:7-diphenyl naphthalene diamine | | 1 | | | | | | | |
| 2:7-di-p-phenetyl naphthalene diamine | | | 1 | | | | | | |
| 1:5-diphenyl naphthalene diamine | | | | 1 | | | | | |
| 1:8-diphenyl naphthalene diamine | | | | | 1 | | | | |
| 1-phenyl-4-p-phenetyl naphthalene diamine | | | | | | 1 | | | |
| 1-phenyl-4-p (OH)-phenyl naphthalene diamine | | | | | | | 1 | | |
| 1:5-di-p(OH) phenyl naphthalene diamine | | | | | | | | 1 | |
| 1:5-dibutyl naphthalene diamine | | | | | | | | | 1 |

These stocks were vulcanized to a comparable state of cure at 40 lbs. steam pressure. Their aging properties were determined by suspending them in an oxygen bomb at 70° C. and 300 lbs. oxygen pressure for 48 hours. The results of this test are given in Table I.

Table I

| Stock | Original tensile | Tensile after aging |
|---|---|---|
| A | 3050 | Completely deteriorated |
| B | 2975 | 2500 |
| C | 2975 | 2350 |
| D | 3150 | 2350 |
| E | 3025 | 2375 |
| F | 2875 | 2625 |
| G | 2900 | 2500 |
| H | 3100 | 2300 |
| I | 3225 | 2725 |

It will be seen from this table that the compounds of this class are very effective as inhibitors of that deterioration which rubber normally undergoes due to the action of heat and oxidation.

In a further test the following stocks were prepared:

|  | A | B | C | D | E |
|---|---|---|---|---|---|
| Rubber | 100 | 100 | 100 | 100 | 100 |
| Zinc oxide | 100 | 100 | 100 | 100 | 100 |
| Sulfur | 3 | 3 | 3 | 3 | 3 |
| Stearic acid | 1 | 1 | 1 | 1 | 1 |
| Lithopone | 20 | 20 | 20 | 20 | 20 |
| Di-o-tolyl-guanidine | .75 | .75 | .75 | .75 | .75 |
| 2:6 - diphenyl - naphthalene-diamine | | 0.1 | 0.25 | .5 | 1.0 |

These stocks were vulcanized for 45 minutes at 40 lbs. steam pressure. Their aging properties were determined by suspending them in an oxygen bomb at 70° C. and 300 lbs. oxygen pressure for 5 days. The results of this test are given in Table II:

Table II

| Stock | Original tensile | Tensile after aging |
|---|---|---|
| A | 3050 | Completely deteriorated in 48 hrs. |
| B | 3450 | 1700 |
| C | 3225 | 2200 |
| D | 3225 | 2375 |
| E | 3325 | 2300 |

It can be seen from this table that 2:6-diphenyl-naphthalene diamine is very effective as an inhibitor of that deterioration which rubber normally undergoes due to the action of heat and oxidation. It will be further noted that this effectiveness is shown to a large extent even when very low concentrations of the inhibitor are used.

Other compounds of this same type which may be mentioned are:

1:2-di-p-tolyl naphthalene diamine

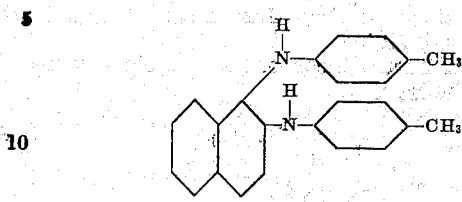

1:3-di-p-phenetyl naphthalene diamine

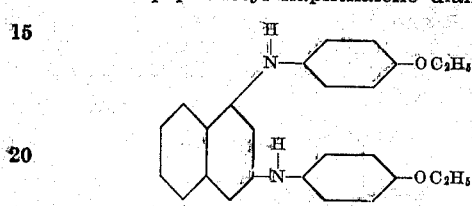

1:6-dibutyl naphthalene diamine

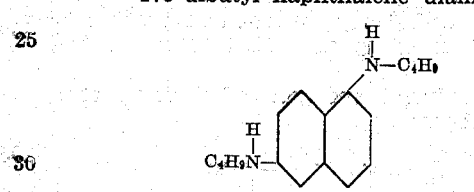

1:7-diphenyl naphthalene diamine

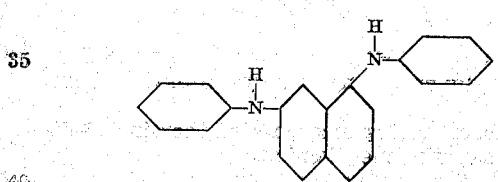

2:3-di-p-anisyl naphthalene diamine

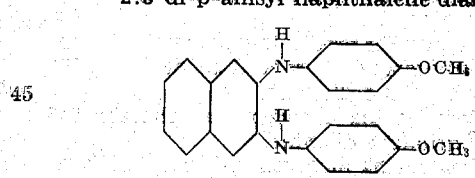

2:6-diethyl naphthalene diamine

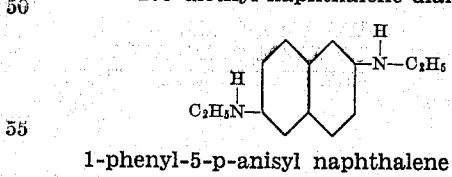

1-phenyl-5-p-anisyl naphthalene diamine

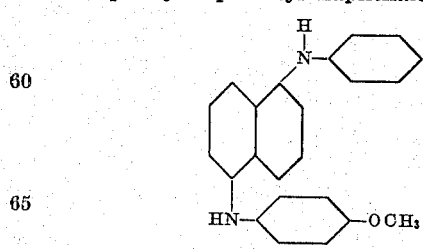

1-p-phenetyl-6-p-tolyl naphthalene diamine

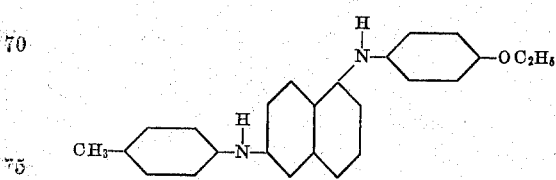

2-m-tolyl-7-o-phenetyl naphthalene diamine

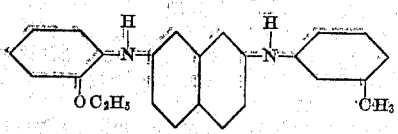

2-propyl-6-ethyl naphthalene diamine

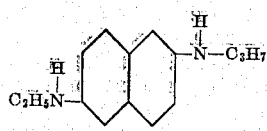

1-butyl-4-phenyl naphthalene diamine

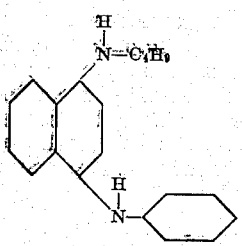

1-ethyl-3-p-tolyl naphthalene diamine

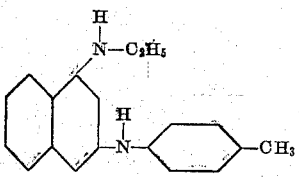

2-propyl-3-p-phenetyl naphthalene diamine

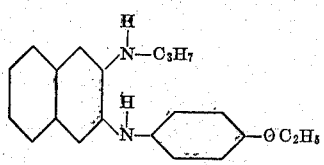

1-p(OH)-phenyl-7-isopropyl naphthalene diamine

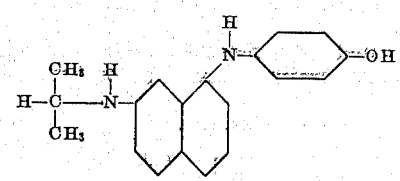

1:5-dibenzyl naphthalene diamine

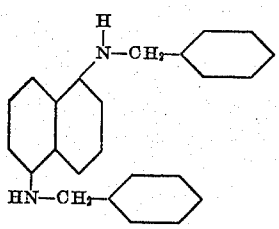

2-benzyl-6-p(OH) phenyl naphthalene diamine

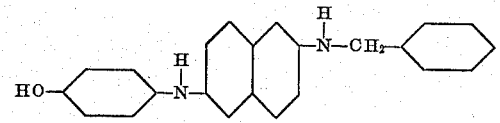

2-b-phenyl-ethyl-7-ethyl naphthalene diamine

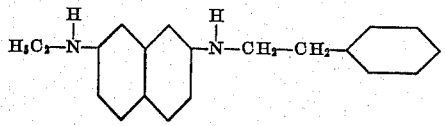

The isomers and homologues of the above compounds may also be employed.

The compounds of our invention are likewise effective when added to the rubber after vulcanization by any of the commonly applied methods of impregnation.

In the examples, we disclosed the use of one part of the deterioration inhibitor to 100 parts of the rubber. However, the proportion of deterioration inhibitor employed may be varied within rather wide limits, depending upon the desire of the user and the nature of the rubber stock employed.

While we have disclosed compositions containing specific compounds and specific methods of preparing the same, it will be readily apparent that the specific compounds employed and the methods of employing the same may be widely varied without departing from the spirit of our invention. Accordingly, the scope of our invention is to be limited solely by the appended claims construed as broadly as is permissible in view of the prior art.

We claim:

1. The method of preserving rubber which comprises incorporating therein a compound of the type:

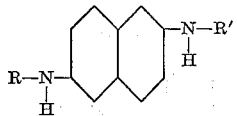

in which R and R' represent members of the group consisting of alkyl, aralkyl and aryl groups.

2. The method of preserving rubber which comprises incorporating therein a compound of the type:

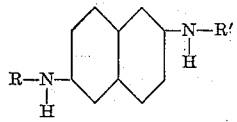

in which R and R' represent similar members of the group consisting of alkyl, aralkyl and aryl groups.

3. The method of preserving rubber which comprises incorporating therein a compound of the type:

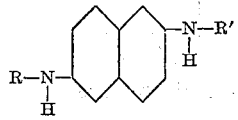

in which R and R' represent different members of the group consisting of alkyl, aralkyl and aryl groups.

4. The method of preserving rubber which comprises incorporating therein 2:6-diphenyl-naphthalene-diamine.

5. Rubber having incorporated therein a compound of the type:

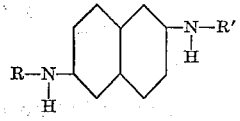

in which R and R' represent members of the group consisting of alkyl, aralkyl and aryl groups.

6. Rubber having incorporated therein a compound of the type:

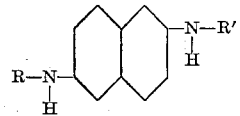

in which R and R' represent similar members of the group consisting of alkyl, aralkyl and aryl groups.

7. Rubber having incorporated therein a compound of the type:

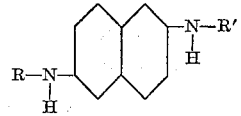

in which R and R' represent different members of the group consisting of alkyl, aralkyl and aryl groups.

8. Rubber having incorporated therein 2:6-diphenyl-naphthalene-diamine.

9. The method of preserving rubber which comprises incorporating therein 2:6 diethyl naphthalene diamine.

10. The method of preserving rubber which comprises incorporating therein 2-benzyl-6-p(OH) phenyl naphthalene diamine.

11. Rubber having incorporated therein 2:6 diethyl naphthalene diamine.

12. Rubber having incorporated therein 2-benzyl-6-p(OH) phenyl naphthalene diamine.

IRA WILLIAMS.
WILLIAM A. DOUGLASS.
ARTHUR MORRILL NEAL.

CERTIFICATE OF CORRECTION.

Patent No. 1,978,444.  October 30, 1934.

IRA WILLIAMS, ET AL.

It is hereby certified that error appears in the printed specification of the above numbered patent requiring correction as follows: Page 2, line 45, for the syllable "raia-" read rela-; and line 63, column D (line 6 of the table), for ".57" read .75; and that the said Letters Patent should be read with these corrections therein that the same may conform to the record of the case in the Patent Office.

Signed and sealed this 18th day of December, A. D. 1934.

Leslie Frazer (Seal)  Acting Commissioner of Patents.